Figure 1:
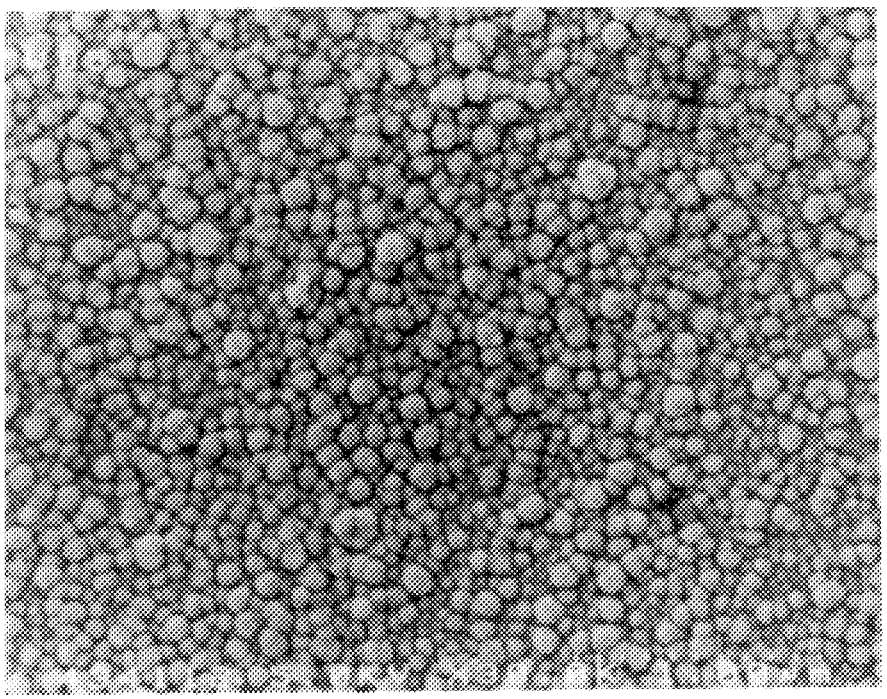

United States Patent [19]

Colquhoun et al.

[11] Patent Number: 5,847,075
[45] Date of Patent: Dec. 8, 1998

[54] POLYMER AND POROUS STRUCTURE

[75] Inventors: Howard Matthew Colquhoun, Knutsford; Andrew Lennard Lewis, Ponciau, both of United Kingdom

[73] Assignee: North West Water Group PLC, United Kingdom

[21] Appl. No.: 505,203

[22] PCT Filed: Feb. 2, 1994

[86] PCT No.: PCT/GB94/00197

§ 371 Date: Oct. 2, 1995

§ 102(e) Date: Oct. 2, 1995

[87] PCT Pub. No.: WO94/18262

PCT Pub. Date: Aug. 18, 1994

[30] Foreign Application Priority Data

Feb. 2, 1993 [GB] United Kingdom .................... 9301993

[51] Int. Cl.⁶ ............................ C08G 73/06; B01D 71/62
[52] U.S. Cl. ........................... 528/327; 528/345; 528/422; 528/423; 521/27; 428/411.1; 210/500; 210/500.21; 210/600
[58] Field of Search ..................................... 528/327, 345, 528/422, 423; 521/27; 428/411.1; 210/500, 500.21, 600

[56] References Cited

U.S. PATENT DOCUMENTS 4,119,581  10/1978  Rembraum et al. ..................... 528/229
4,994,209  2/1991   Okazaki .................................. 252/587

*Primary Examiner*—P. Hampton-Hightower
*Attorney, Agent, or Firm*—Michael, Best & Friedrich

[57] ABSTRACT

A polymer characterised by the presence of ylid linkages in the main polymer chain of formula (A) where the dashed line represents the remainder of a ring system for which the N+ provides a heteroatom, and E is a strongly electron withdrawing group. Preferred polymers in accordance with the invention are characterised by the presence of linkages in the polymer main chain of formula (I). The polymers of the invention may be fabricated as membranes for use in various separation processes, e.g. ultrafiltration, nanofiltration, and reverse osmosis.

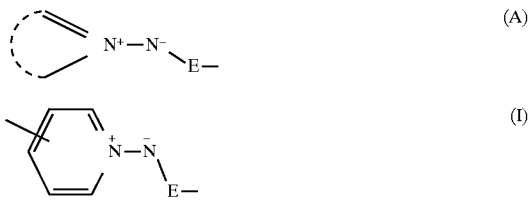

31 Claims, 2 Drawing Sheets

POLYMER AND POROUS STRUCTURE

This invention relates to a novel type of polymer, and its use in structures having high porosity, for example porous membranes for use in, e.g. ultrafiltration, nanofiltration and reverse osmosis.

Accordingly the present invention provide's a polymer characterised by the presence of ylid linkages in the main polymer chain of the formula

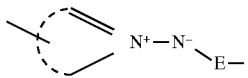

where the dashed line represents the remainder of a ring system for which the $N^+$ provides a heteroatom, and E is a strongly electron withdrawing group.

The ring system is preferably monocyclic (e.g. having a total of 6 atoms) but may also, for example, be a fused ring system. Preferably the $N^+$ provides the sole nitrogen atom in the ring species and preferably also there are no other ring heteroatoms.

The ring preferably has 6 ring atoms.

In a preferred embodiment, therefore, the invention provides a polymer characterised by presence of linkages in the polymer main chain of the formula (I)

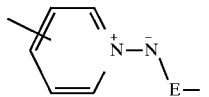

where E is a strongly electron withdrawing group.

Examples of the group E include carbonyl and sulphonyl.

Such polymers of the present invention are of use as membranes for ultrafiltration, nanofiltration and reverse osmosis, and display considerable hydrophilicity, absorbing up to 20% water on exposure to atmospheric moisture, and yet the membranes are robust and have sufficiently high strength to withstand pressures applied across the membrane structures in use for ultrafiltration, nanofiltration and reverse osmosis.

These polymers and porous membranes of these polymers are easily prepared.

The polymer of the present invention may be unbranched or branched-chain and may optionally be cross-linked.

An unbranched polymer of the present invention may be a polymer characterised by the presence of units in the polymer main chain of the formula (IIA):

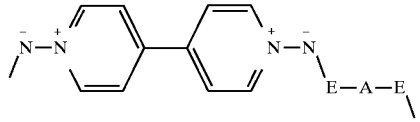

where A is an acyclic or cyclic organic diradical, or a combination of such diradicals.

An unbranched polymer of the present invention may be a linear, rigid-rod type of polymer of the formula (IIB) below:

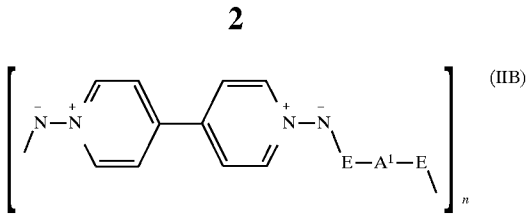

where $A^1$ is a linear acyclic organic diradical, or cyclic organic para-diradical, or a combination of, such diradicals, and n is 3 to 3000.

An unbranched polymer of this type of rigid, unbranched molecular structure could, in principle, give rise to anisotropic (i.e. liquid-crystalline) solutions in which at least a proportion of the unbranched polymer molecules exist in ordered domains and are self-orienting under mild shear.

Sheets and fibres of such materials produced under shear will tend to be highly oriented and hence characterised by desirably high tensile moduli.

An unbranched polymer of the present invention may be of the formula (IIIA):

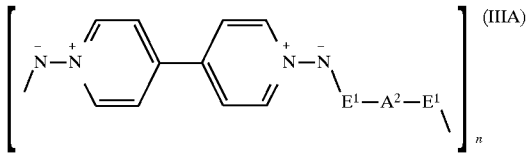

wherein n is 3 to 3000;

$E^1$ is independently carbonyl or sulphonyl; and $A^2$ is unbranched alkanediyl, or cycloalkanediyl, arenediyl or heteroarenediyl, or a combination of such diradicals.

Examples of $A^2$ unbranched alkanediyl include optionally substituted polymethylene.

Examples of $A^2$ cycloalkanediyl include cyclohexane-1,4-diyl and cyclohexane-1,3-diyl.

Examples of $A^2$ Arenediyl include 1,4-phenylene, 1,3-phenylene, 4,4'-biphenylene, 4,4'-oxybiphenylene naphthalene-2,6-diyl, and hexafluoroisopropylidene-4,4-bis (phenylene).

Examples of $A^2$ heteroarenediyl include pyridine-2,5-diyl, pyridine-2,6-diyl, and pyridine-3,5-diyl.

Examples of $A^2$ which is a combination of such diradicals include para-xylylene and meta-xylylene.

A linear rigid rod unbranched polymer of the present invention may be of the formula (IIIB):

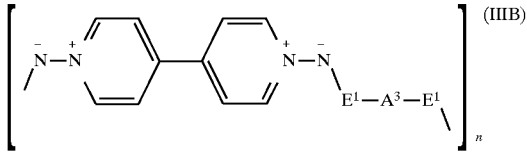

where $A^3$ is unbranched alkanediyl, or para-cycloalkanedlyl, para-arenediyl or para-heteroarenediyl, each cyclic species having an even number of ring atoms, or a combination of such diradicals.

Examples of $A^3$ unbranched alkanediyl include optionally substituted polymethylene.

Examples of $A^3$ para-cycloalkanediyl, having an even number of ring atoms include cyclohexane-1,4-diyl.

Examples of $A^3$ para-arenediyl having an even number of ring atoms include 1,4-phenylene, and 4,4'-biphenylene.

Examples of $A^3$ para-heteroarenediyl having an even number of ring atoms include pyridine-2,5-diyl.

Examples of $A^3$ which is a combination of such diradicals include para-xylylene.

The polymer of the present invention may optionally be cross-linked. Examples of cross-linking functions include lateral linkages of formula (I), as for the characterising linkages in the main chain.

Polymers of the present invention which are cross-linked may thus be characterised by the presence of linkages in the polymer main chain of the formula (IV):

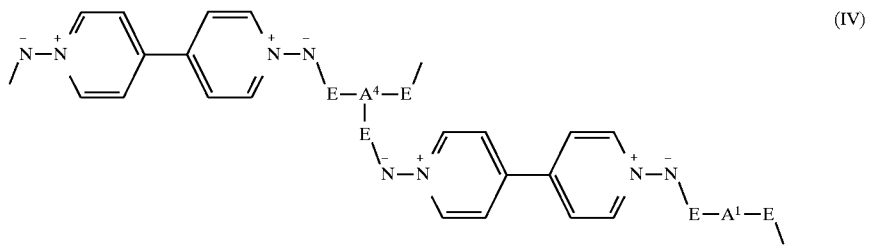

(IV)

where $A^4$ is alkanetriyl, cycloalkanetriyl, arenetriyl or heteroarenetriyl, or a combination of such triradicals with up to 3 diradicals $A^1$ as hereinbefore defined.

As examples of polymers of which the membrane may be made are inter alia polymers and copolymers of the general formulae (V)–(VIIIB), in which n and $E^1$ are as hereinbefore defined:

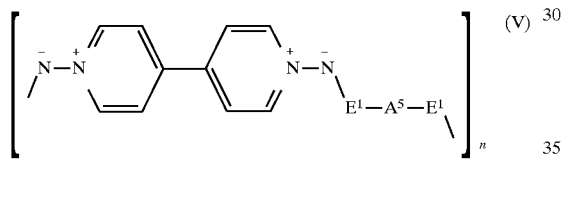

(V)

where $A^5$ is unbranched alkanediyl, such as optionally substituted polymethylene.

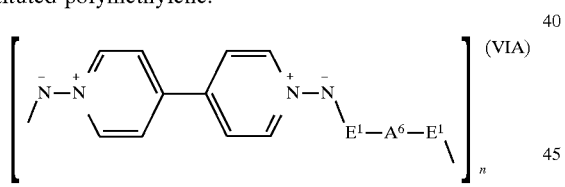

(VIA)

where $A^6$ is cycloalkanediyl, such as cyclohexane-1,3-diyl.

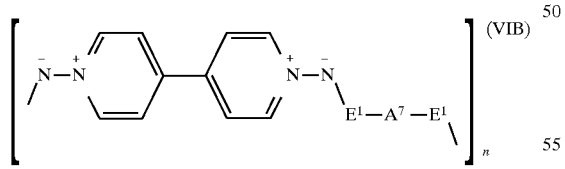

(VIB)

where $A^7$ is para-cycloalkanediyl, such as cyclohexane-1,4-diyl.

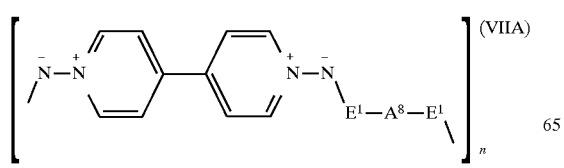

(VIIA)

where $A^8$ is arenediyl such as 1,3-phenylene

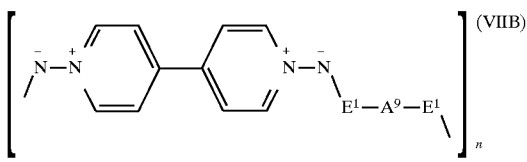

(VIIB)

where $A^9$ is para-arenediyl such as 1,4-phenylene, 4,4'-biphenylene and 4,4'-oxy-biphenylene.

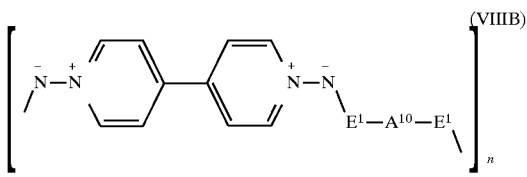

(VIIIB)

where $A^{10}$ is heteroarenediyl, such as pyridine-2,6-diyl.

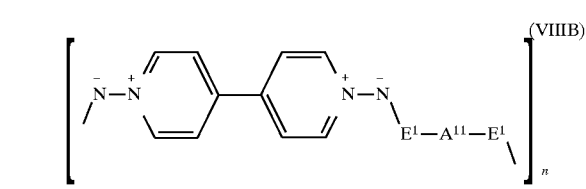

(VIIIB)

where $A^{11}$ is para-heteroarenediyl, such as pyridine-2,5-diyl.

(VIIIB)

where $A^{12}$ is a combination of such diradicals, such as para-xylylene and meta-xylylene.

It will be appreciated that the polymers of formulae V to VIIIB may optionally be cross-linked, and the cross-linking functions include lateral linkages of formula (I), as for the characterising linkages in the main chain.

Polymers of the present invention which are cross-linked may thus be characterised by the presence of lateral linkages of formula I substituting the moiety of formula V to VIIIB respectively.

Whereas the polymer is preferably a homopolymer, we do not exclude the possibility that it may be a copolymer, e.g.

one wherein the units represented by A are a mixture of two or more species within the definition of A.

The polymer of the present invention may be prepared by a process characterised by reacting a compound characterised by the presence of a group of the formula:

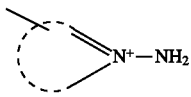

with a compound characterised by the presence of a group of the formula (X):

—E—L        (X)

where E is as hereinbefore defined and L is a good leaving group, such as a strongly electronegative group, e.g. halide.

Preferred polymers of the present invention may be prepared by a process characterised by reacting a compound characterised by the presence of a group of the formula (IX):

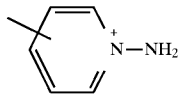

with a compound characterised by the presence of a group of the formula (X)—see above.

The amino compounds shown above (e.g. of formula (IX)) will of course contain a counterion for the positively charged nitrogen. The counterion may be any anion but is usually the anion of a strong acid, such as halide, sulphate or tetrafluoroborate.

An unbranched polymer of the present invention of the formula (IIIA) or (IIIB) may be prepared by a process characterised by reacting a compound of the formula (XI):

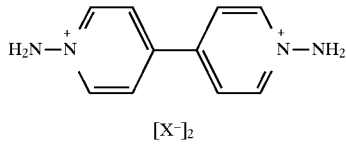

wherein X is an anion, preferably of a strong acid, with a compound of the formula, (XIIA) or (XIIB) respectively:

L—E—A$^1$—E—L        (XIIA)

L—E—A$^2$—E—L        (XIIB)

where A$^1$, A$^2$ and E are as hereinbefore defined and L is a good leaving group, such as a strongly electron withdrawing group, e.g. halide.

Both the compounds characterised by the presence of a group of the formula (IX) and the compound characterised by the presence of the group of the formula (X) may be difunctional in their respective groups, when the product polymer will be unbranched.

The process of the present invention may however also be used for branched-chain products and may optionally be adapted to give a product which is cross-linked.

Thus, e.g. the latter compound may be trifunctional in the group of the formula (X).

The uncrosslinked unbranched products tend to be of medium to high molecular weight, and are soluble in acid media, in particular formic acid.

The branched-chain and cross-linked products are generally less soluble than the unbranched products and e.g. if a sufficiently high proportion of tri- or higher-functional monomer species are used may be essentially insoluble all solvents.

The reaction may be carried out in a solvent in which both the starting materials are soluble, or via an interfacial process using solvents for the starting material which are at least partially mutually immiscible.

According to the present invention we also provide a membrane comprising a polymer of the present invention.

When a polymer of the present invention is used in the form of a membrane, it will have pore sizes in the range of 100 to 1000 Å e.g. in ultrafiltration, 10 to 100 Å in nanofiltration, or 3 to 10 Å in reverse osmosis.

It should also withstand burst pressures up to 100 bars which may impose some limitation on the form of the structure used as a membrane.

For these reasons, the membrane may conveniently be a composite membrane, especially when a reverse osmosis membrane or a nanofiltration membrane.

Alternatively or additionally it may comprise a highly oriented polymer of the present invention characterised by a desirably high tensile modulus. As noted hereinbefore sheets and fibres of a polymer of the present invention which is a linear, rigid-rod type of polymer of the formula (IIB) above which have been produced under shear will tend to be highly oriented and hence characterised by desirably high tensile moduli.

A composite membrane of the present invention may conveniently be synthesised by synthesising a layer of the polymer of the present invention in situ by carrying out the process of the present invention interfacially at the surface of a microporous membrane, which itself should have pore sizes in the range of 100 to 1000 Å.

The present invention is illustrated in the following examples, which are concerned with the production of i) polymers of the present invention, and ii) composite membranes of the present invention.

Reference is also made in the Examples to the accompanying drawings, in which

Figure 2:
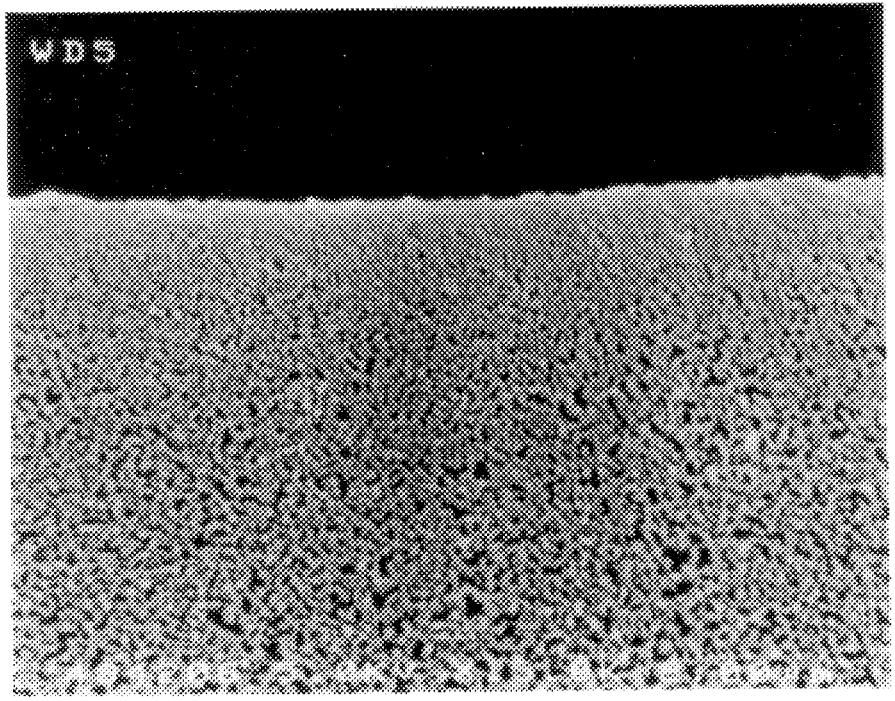
Figure 3:
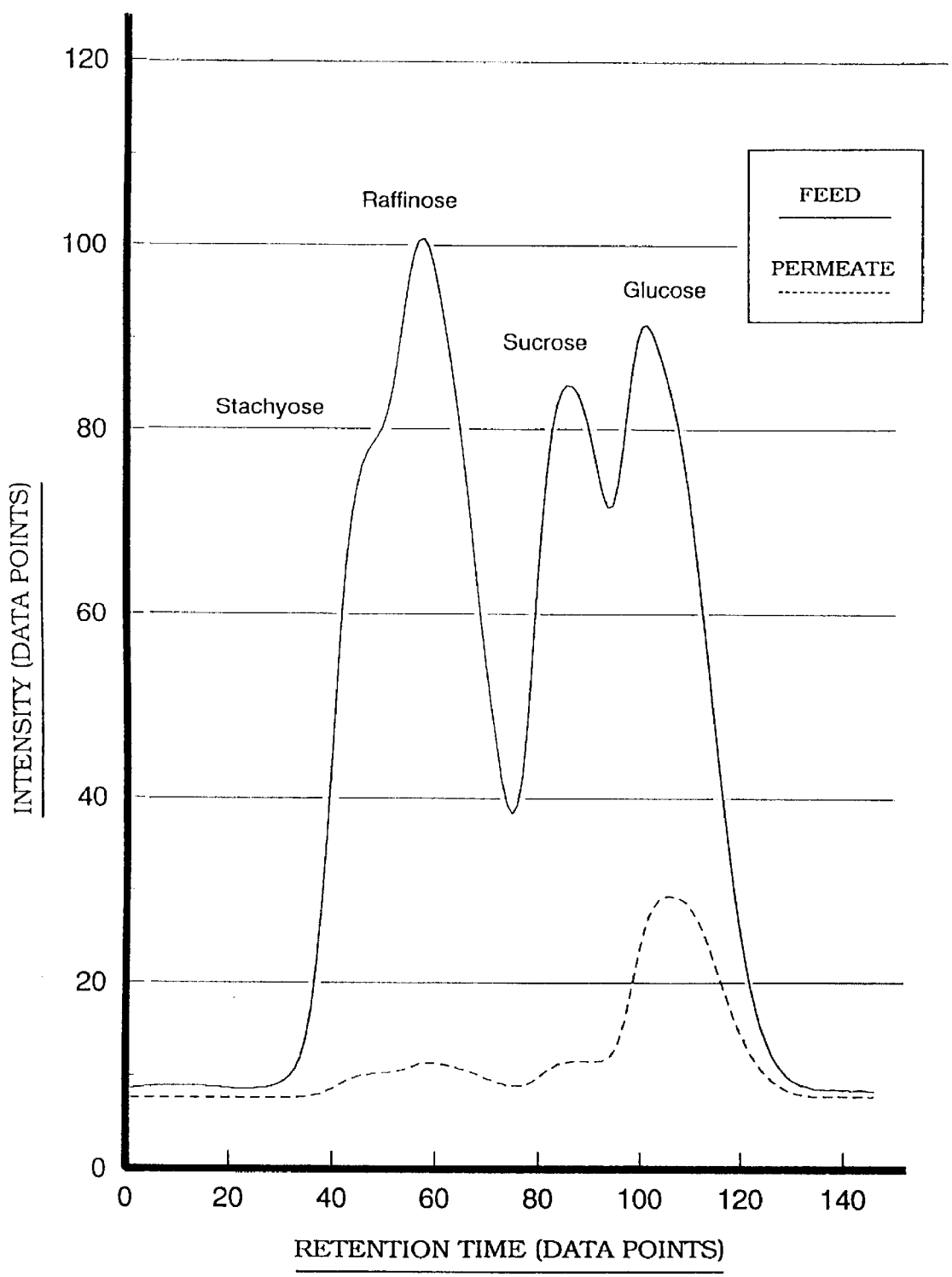

FIG. 1. is a scanning electron micrograph (×30,000) of the surface of the membrane formed in Example 10;

FIG. 2. is a scanning electron micrograph (×15,000) of the cross-section of the membrane formed in Example 10; and FIG. 3. shows gel permeation chromatograms of feed and permeate solutions for a Procedure described in Example 12.

EXAMPLE 1

Preparation and characterisation of a unbranched polymer of the invention.

A solution containing 0.90 g of 1,1'-diamino-4,4'-bipyridinium di-iodide in 100 cm3 of 0.08 molar aqueous sodium hydroxide was poured carefully onto a solution of isophthaloyl chloride (0.6 g) in 100 cm3 of dichloromethane. It was observed that a bright yellow film of polymer was formed immediately at the interface between the two solutions.

The two phases were then stirred using a high-shear mixing head for 7 minutes.

The resulting insoluble yellow polymer was filtered off, washed with methanol and then hot water, and finally dried in a vacuum desiccator (Yield 80%).

The structure of this polymer is shown below:

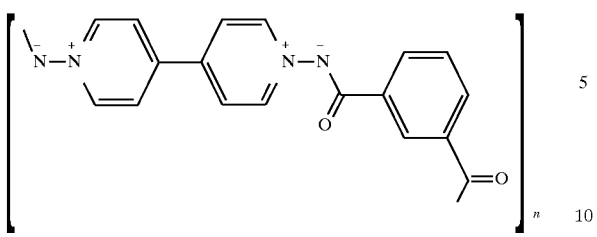

The polymer was insoluble in common organic solvents such as toluene, chloroform, or dimethylformamide, but proved soluble in acidic media such as formic acid, trifluoroacetic acid, and in mixtures of 2,2,3,3,3-pentafluoropropanol and water. Its inherent viscosity, measured as a 0.1 wt % solution in formic acid was 4.05, indicating that the polymer was of high molecular weight.

The structure shown above was confirmed by high resolution $^1$H and $^{13}$C NMR spectroscopy, again using formic acid as solvent. The dry polymer was hygroscopic, absorbing approximately 10% by weight of water from the air at 21° C. and 35% relative humidity.

EXAMPLES 2–9

A number of different polymers of the invention, prepared by the method of Example 1, but varying the acid chloride component, are shown in the following Table.

TABLE

| EXAMPLE | ACID CHLORIDE | POLYMER YIELD (%) | INH. VISCOSITY (0.1% IN HCO$_2$H) |
|---|---|---|---|
| 2 | ClOC—C$_6$H$_4$—COCl (para) | 76 | 2.62 |
| 3 | 1,3,5-benzenetricarbonyl trichloride | 91 | insoluble (cross-linked) |
| 4 | ClOC—C$_6$H$_4$—C$_6$H$_4$—COCl | 67 | 2.07 |
| 5 | ClOC—C$_6$H$_4$—O—C$_6$H$_4$—COCl | 88 | 3.65 |
| 6 | ClOC—C$_6$H$_4$—CF$_2$—C$_6$H$_4$—COCl | 82 | 1.48 |
| 7 | 2,6-naphthalenedicarbonyl dichloride | 83 | 1.48 |
| 8 | 3,5-pyridinedicarbonyl dichloride | 56 | 1.99 |
| 9 | ClO$_2$S—C$_6$H$_4$—C$_6$H$_4$—SO$_2$Cl | 60 | 1.31 |

EXAMPLES 10–12

Preparation and characterisation of membranes of the invention.

EXAMPLE 10

A disc of "Bioken" (polyethersulphone) 10,000 MW-cutoff ultrafiltration support-membrane, 11.25 cm (4.5 inches) in diameter, was immersed for 2 minutes in a solution containing 1 wt % of 1,1'-diamino-4,4'-bipyridinium. di-iodide in 0.08 molar aqueous sodium hydroxide. The support-membrane was drained and then contacted with a 0.1% solution of benzene-1,3-5-tricarbonyl chloride ("trimesoyl chloride") in hexane. After 20 seconds the hexane solution was decanted off and the membrane was rinsed for 12 hours in deionised water. The surface of the previously white membrane was now bright yellow in colour, indicating formation of a surface-film of a polymer of the invention. Examination of this membrane by high-resolution scanning electron microscopy showed a nodular surface-structure with average nodule diameter ca. 0.1 $\mu$m, (FIG. 1) and an average cross-sectional thickness for the supported nanofiltration membrane of ca. 0.05 $\mu$m (FIG. 2).

This membrane was found to possess excellent nanofiltration properties, giving a molecular weight cut-off of 380 (as measured by rejection of a mixture of glucose {MW 181}, sucrose {MW 342}, raffinose {MW 504}, and stachyose {MW 666}) and a water flux of 32 l/m$^2$/hr, measured at 5 bar. Molecular weight cut-off is here defined as the lowest molecular weight of a solute for which the membrane shows >90% rejection. At 40 bar the membrane showed a rejection for sodium chloride (2000 ppm) of 50% and a water flux of 8954 liters/m$^2$/day (220 US gallons/ft$^2$/day).

EXAMPLE 11

The procedure of Example 10 was followed, except that the support membrane was of Udel polysulphone rather than polyethersulphone, having been prepared by machine-casting a solution containing Udel 3500 (20.2 wt %) in a mixture of dimethylformamide (73.8 wt %) and diglyme (6 wt %) at a thickness of 250$\mu$ onto a non-woven polyester paper and quenching in water.

The nanofiltration membrane produced using this support-membrane gave a molecular weight cut-off of 300 (measured as in Example 10) and a water flux of 29 l/m$^2$/hr, measured at 5 bar. At 40 bar the membrane showed a rejection for sodium chloride (2000 ppm) of 83% and a water flux of 4477 liters/m$^2$/day (110 US gallons/ft$^2$/day).

EXAMPLE 12

The procedure of Example 11 was followed, except that a 2:1 (wt:wt) mixture of terephthaloyl chloride and trimesoyl chloride was used in place of pure isophthaloyl chloride. The total concentration of acid chloride in hexane remained at 0.1%.

This membrane was found to possess particularly good nanofiltration properties, giving a molecular weight cut-off of 210 (measured as in Example 10) and a water flux of 42 l/m$^2$/hr, measured at 5 bar. Gel permeation chromatograms of the feed and permeate solutions from this test are shown in FIG. 3.

At 40 bar this membrane showed a rejection for sodium chloride (2000 ppm) of 84% and a water flux of 5291 liters/m$^2$/day (130 US gallons/ft$^2$/day).

EXAMPLE 13

Liquid crystalline behaviour of polymers of the invention.

Unbranched, rigid-rod polymers as prepared in Examples 2, 4 and 7, were dissolved in formic acid to give solutions containing 15–20% polymer by weight. Such solutions displayed the shear-opalescence characteristics of a nematic liquid-crystal phase.

In contrast, formic acid solutions of non-unbranched in Examples 1, 5, 6 and 8 did not show this phenomenon. The cross-linked polymer prepared in Example 3 was insoluble in all solvents tested.

We claim:

1. A polymer having ylid linkages in the main polymer chain of the formula

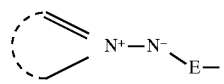

where the dashed line represents the remainder of a ring system for which the N$^+$ provides a heteroatom, and E is a divalent strongly electron withdrawing group.

2. A polymer as claimed in claim 1 having linkages in the polymer main chain of the formula (I)

3. A polymer as claimed in claim 1 wherein E is carbonyl or sulphonyl.

4. A polymer as claimed in claim 3 having units in the polymer main chain of the formula (IIA):

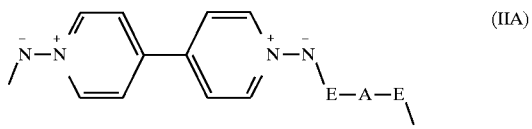

where A is an acyclic or cyclic organic diradical or a combination thereof.

5. A polymer as claimed in claim 4 which is a linear, polymer of formula (IIB):

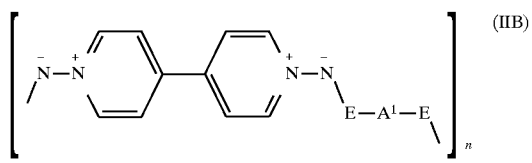

where A$^1$ is a linear acyclic organic diradical or cyclic organic para-diradical, or a combination thereof, and n is 3 to 3000.

6. A polymer as claimed in claim 5 which displays liquid crystal characteristics.

7. A polymer as claimed in claim 4 which is of the formula (IIIA):

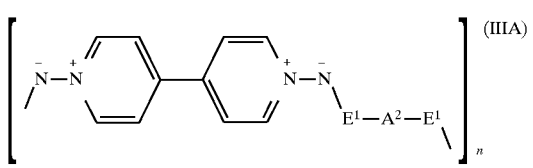

wherein n is 3 to 3000;

$E^1$ is independently carbonyl or sulphonyl; and $A^2$ is unbranched alkanediyl or cycloalkanediyl, arenediyl or heteroarenediyl, or a combination thereof.

8. A polymer as claimed in claim 7 wherein $A^2$ is optionally substituted polymethylene.

9. A polymer as claimed in claim 7 wherein $A^2$ is cyclohexane-1,4-diyl or cyclohexane-1,3-diyl.

10. A polymer as claimed in claim 7 wherein $A^2$ is 1,4-phenylene, 1,3-phenylene, 4,4'-biphenylene or 4,4'-oxybiphenylene naphthalene-2,6-diyl, or hexafluoroisopropylidene-4,4-bis(phenylene).

11. A polymer as claimed in claim 7 wherein $A^2$ is pyridine-2,5-diyl, pyridine-2,6-diyl or pyridine-3,5-diyl.

12. A polymer as claimed in claim 7 wherein $A^2$ is para-xylylene or meta-xylylene.

13. A polymer as claimed in claim 4 which is of the formula (IIIB):

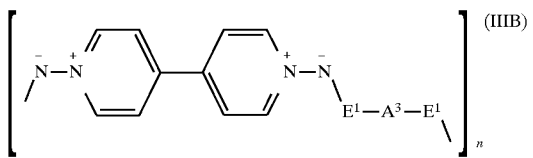

where $A^3$ is an unbranched alkanediyl, or para-cycloalkanedlyl, para-arenediyl or para-heteroarenediyl, each cyclic species having an even number of ring atoms, $E^1$ is as defined in claim 7, and n is 3 to 3000.

14. A polymer as claimed in claim 13 wherein $A^3$ is optionally substituted polymethylene.

15. A polymer as claimed in claim 13 wherein $A^3$ is cyclohexane-1,4-diyl.

16. A polymer as claimed in claim 13 wherein $A^3$ is 1,4-phenylene, 4,4'-biphenylene or 4,4'-oxybiphenylene.

17. A polymer as claimed in claim 13 wherein $A^3$ is pyridine-2,5-diyl.

18. A polymer as claimed in claim 13 wherein $A^3$ is para-xylylene.

19. A polymer as claimed in claim 1 which is cross-linked.

20. A polymer as claimed in claim 19 having linkages in the polymer main chain of the formula (IV):

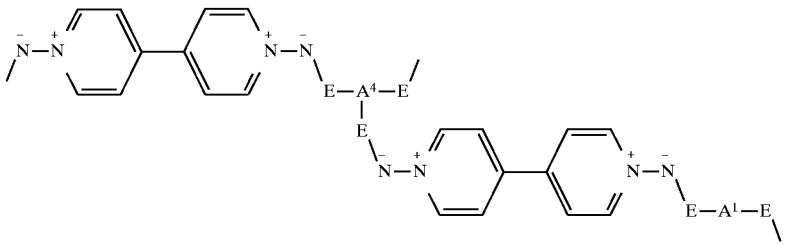

where $A^4$ is alkanetriyl, cycloalkanetriyl, arenetriyl or heteroarentriyl or a combination thereof with up to 3 diradicals $A^1$ as defined in claim 5.

21. A method of producing a polymer as claimed in claim 1 comprising reacting a compound having a group of the formula

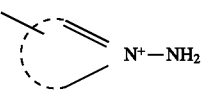

with a compound having a group of the formula (X)

E—L                              (X)

where E is as defined in claim 1 and L is a leaving group.

22. A method of producing a polymer as claimed in claim 2 comprising reacting a compound having a group of the formula (IX)

with a compound having a group of the formula (X)

—E—L                             (X)

where E is as defined in claim 1 and L is a leaving group.

23. A method as claimed in claim 22 comprising reacting a compound of the formula XI:

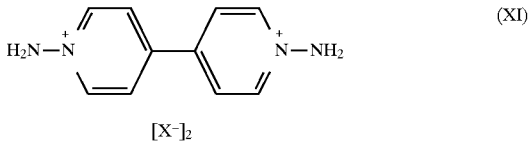

[X⁻]₂ where $X^-$ is an anion with a compound of the formula (XIIA) or (XIIB):

L—E—A—E—L                   (XIIA)

L—E—A²—E—L                (XIIB)

where $A^1$ is as defined in claim 5 and $A^2$ is as defined in claim 7.

24. A method as claimed in claim 23 wherein $X^-$ is an anion derived from a strong acid.

25. A method as claimed in claim 23 effected by an interfacial polymerisation processing using solvents for the starting material which are at least partly mutually immiscible.

26. A membrane comprising a polymer as claimed claims 1.

27. A membrane as claimed in claim 26 having a pore size in the range 10 to 1000 Å.

28. A composite membrane comprising a porous membrane as claimed in claim 26 laminated to a porous substrate.

29. A composite membrane as claimed in claim 28 wherein the porous substrate is a microporous membrane.

30. A separation process using a membrane as claimed in claim 26.

31. A process as claimed in claim 30 which is ultrafiltration, nanofiltration, or reverse osmosis.

* * * * *